Aug. 4, 1925.
A. J. JOHNSON
WEEDING IMPLEMENT
Filed Sept. 12, 1924
1,548,040
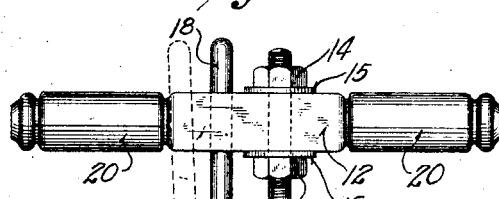
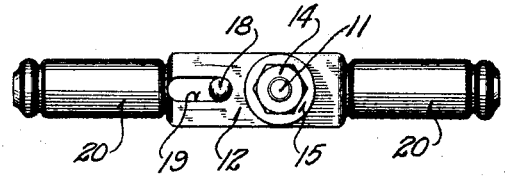
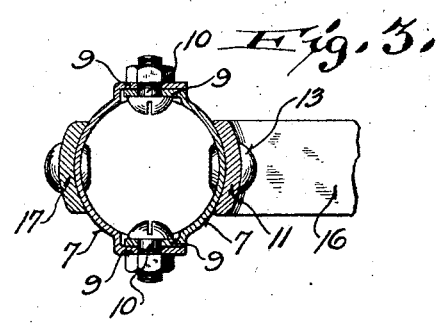
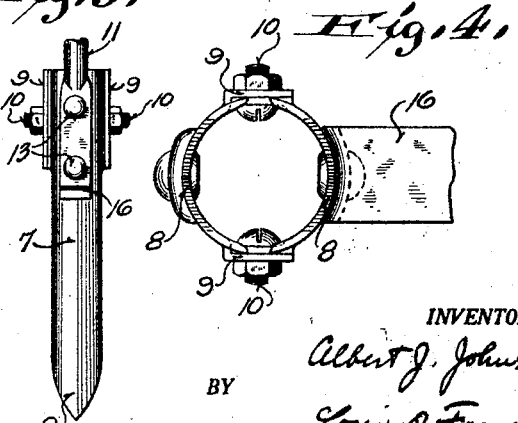
INVENTOR.
Albert J. Johnson
BY Louis O. French
ATTORNEY.

Patented Aug. 4, 1925.

1,548,040

UNITED STATES PATENT OFFICE.

ALBERT J. JOHNSON, OF MILWAUKEE, WISCONSIN.

WEEDING IMPLEMENT.

Application filed September 12, 1924. Serial No. 737,384.

*To all whom it may concern:*

Be it known that I, ALBERT J. JOHNSON, a citizen of the United States of America, and resident of Milwaukee, in the county of Milwaukee and State of Wisconsin, have invented new and useful Improvements in Weeding Implements, of which the following is a description, reference being had to the accompanying drawings, which are a part of this specification.

The invention relates to weeding implements, and more particularly to that type of an implement which may be actuated by the operator in a standing position.

The object of the invention is to provide a weeder of the type above described which will enable the operator to take out long-rooted weeds, such as dandelions, in an expeditious manner, by the removal of the root and a small amount of soil immediately surrounding the same.

The invention further consists in the several features hereinafter set forth and more particularly defined by claims at the conclusion hereof.

In the drawings: Fig. 1 is an elevation view of the weed extractor embodying the invention;

Fig. 2 is a top plan view thereof;

Fig. 3 is a section taken on the line 3—3 of Fig. 1;

Fig. 4 is a bottom end view, parts being broken away;

Fig. 5 is a detail side view of one of the digging blades.

The device includes a pair of blades 7, each semi-tubular in cross-section and provided with pointed lower ends 8, said blades provided with apertured ears 9 to take pivot bolts 10.

A rod or bar 11 connects one of these blades to a handle 12, the lower ends of said rod being secured to the blade 6 in any suitable manner, as by rivets 13. The upper end of the rod 11 is threaded and passes through a hole in the handle to which it is clamped by nuts 14 on said threaded end engaging washers 15 adjacent the handle. The lower end of the rod is flattened out and bent laterally to form a foot-rest 16.

A rod 17 is connected, as by rivets, at its lower end to the other blade and its upper end 18 extends through and is slidably mounted in a slot 19 in the handle and projects above the top surface of the handle. The ends of this slot 18 limit the swinging movement of this rod 17 and reduce the movement of the blade carried thereby relative to the other blade.

The handle has hand-hold portions 20 which the operator grasps in operating the tool.

In operation, with the blades as shown in full lines, the operator centers them over the dandelion or other weed to be extracted, and then by pressure from the handle aided by pressure of his foot on the rest 16, the blades are driven into the soil around the root of the weed to the desired depth, after which the operator pushes the upper end 18 of the rod 17 from its full to its dotted-line position, thereby closing the blades 6 about the root which is then lifted from the soil and thereafter removed from the blades.

The movement of the blades is preferably relatively small so that the extracted root may not be discharged by the blades when in full-line position shown, the limited movement assisting to some extent in loosening the previously extracted roots from the blades but preventing such a separation of the blades as would result in digging up or cutting too much soil adjacent the weed.

From the foregoing it will be noted that the weeder may readily be actuated by the operator in a standing position, and that the control of the blades is at the handle.

I desire it to be understood that this invention is not to be limited to any particular form or arrangement of parts except in so far as such limitations are included in the claims.

What I claim as my invention is:

1. In a weeding tool, the combination with a pair of pivoted digging blades, rods secured to said blades, a handle, secured to one of said rods, having a slot therein, the rod of the other blade projecting through said slot and extending above the handle, said slot permitting limited swinging movement of the blades relative to each other.

2. In a weeding tool, the combination with a pair of pivoted digging members including semi-tubular blades and supporting members secured at their lower ends to said blades, of a handle secured to one of said supporting members and extending laterally therefrom, and means on the handle for limiting the swinging movement of the other supporting member.

3. In a weeding tool, the combination with a pair of pivoted semi-tubular digging blades, a handle, rods secured at their lower ends to said blades, one of said rods having a laterally projecting foot portion adjacent the blade to which it is secured and having its upper end secured to said handle, the other rod being limited in its movement by said handle and having its upper end projecting above said handle.

4. In a weeding tool, the combination with a pair of pivoted digging members including semi-tubular blades and supports for said blades, a handle having its medial portion secured to one of said supports and provided with means permitting limited swinging movement of the other support, said handle having end portions forming hand grips, and a laterally projecting foot-pressure member at the lower end portion of the tool.

In testimony whereof, I affix my signature.

ALBERT J. JOHNSON.